United States Patent [19]

Jambor et al.

[11] Patent Number: 4,903,988
[45] Date of Patent: Feb. 27, 1990

[54] STEERING ASSEMBLY FOR MOTOR CARS

[75] Inventors: Arno Jambor, Vaihingen/Enz; Dieter Gürtler, Stuttgart, both of Fed. Rep. of Germany

[73] Assignee: Daimler-Benz AG, Stuttgart, Fed. Rep. of Germany

[21] Appl. No.: 279,809

[22] Filed: Dec. 5, 1988

[30] Foreign Application Priority Data

Dec. 4, 1987 [DE] Fed. Rep. of Germany ....... 3741130

[51] Int. Cl.$^4$ .............................................. B62D 1/10
[52] U.S. Cl. .................................... 280/771; 74/492; 180/271; 280/748
[58] Field of Search ................. 280/771, 668, 94, 701, 280/660, 666, 748, 727, 119; 74/491, 492; 285/45; 160/271

[56] References Cited

U.S. PATENT DOCUMENTS 4,400,012 8/1983 Otsuka ................................ 280/777

FOREIGN PATENT DOCUMENTS 3437214 5/1985 Fed. Rep. of Germany .

Primary Examiner—Richard A. Bertsch
Attorney, Agent, or Firm—Barnes & Thornburg

[57] ABSTRACT

In a steering wheel assembly for motor cars having a steering wheel column with two covering segments arranged side by side in an upper region in front of a steering wheel and with a passageway therebetween for the spokes of a steering wheel to pass through between the segments. A locking mechanism is provided to connect the covering segment to the steering drive. This locking mechanism is made to be disengageable from its locked fixed rotational position upon the occurrence of an obstruction in the rotation of the steering wheel hub or of the spokes to it, and thus allows at least one covering segment to be able to be rotated with the steering wheel when normal rotation is obstructed and to be reengageable in it original position after removal of the obstruction.

3 Claims, 2 Drawing Sheets

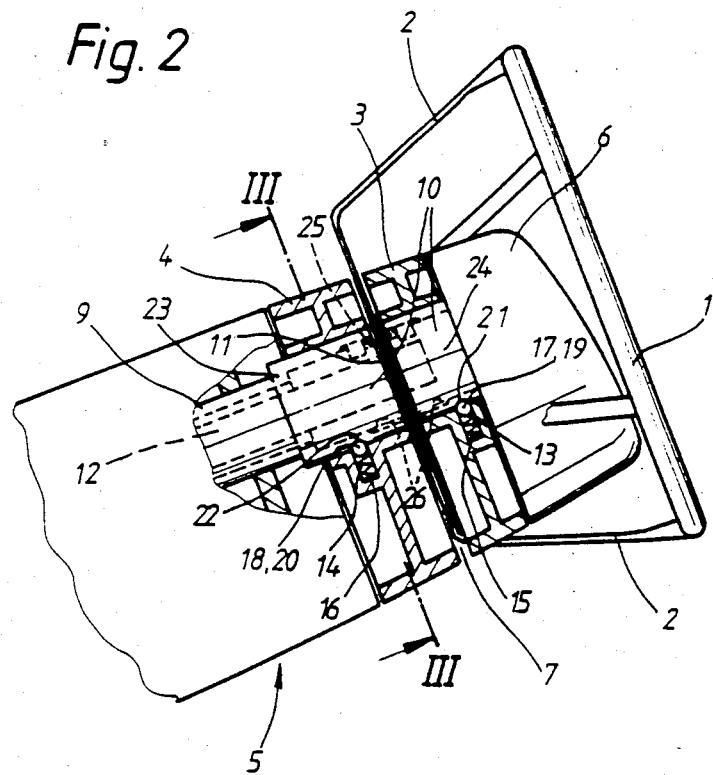
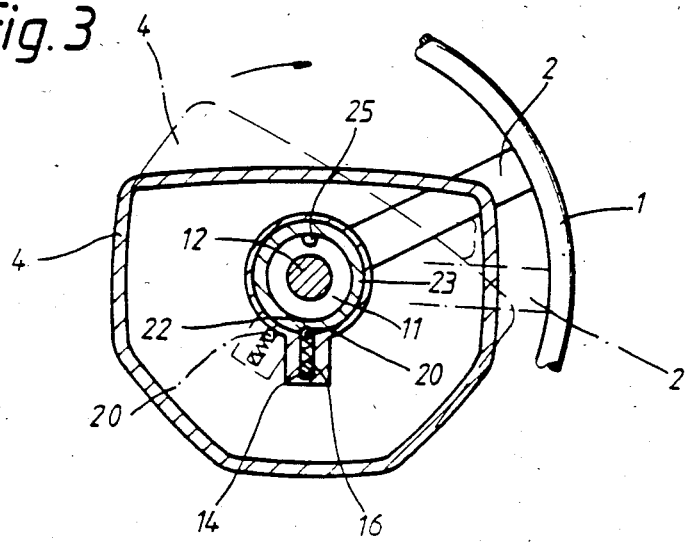

STEERING ASSEMBLY FOR MOTOR CARS

BACKGROUND AND SUMMARY OF THE INVENTION

The invention relates to a steering assembly for motor cars having a fixed casing tube which centrally houses a steering column in its interior. The steering column is enclosed at an upper region in front of a steering wheel by two covering segments arranged side by side. A steering wheel hub is located adjacent said upper region and is connected to spokes of the steering wheel which pass through an opening between the two covering segments. At least one of the two covering segments, which is remote from the steering wheel, being rotatively locked relative to the casing tube.

A steering assembly of this general type is known from German patent application DE-OS 3,437,214. There, the covering segment more remote from the drive is locked by fastening webs to a housing which is fastened to a casing tube. The covering segment located closer to the driver and arranged above the remote segment is coupled to the latter by a pinion shaft.

The spokes and the hub of the steering wheel execute a movement relative to these fixed covering segments. However, due to the rotation gap between the covering segments which is necessary for this relative movement, there is a greater danger of the steering wheel suddenly becoming obstructed in its rotation by a part, which may be a portion of a glove, a shawl or of a flexible key case, happening to enter this rotation gap, with the result that the vehicle can no longer be steered.

In order to reduce this danger, masking parts which are fastened to the steering wheel hub and move with the latter, are provided in the above-mentioned specification.

However, such masking parts are necessarily fixedly arranged and are only effective if they cover the rotation gap with a very small interval and which can only be used for covering segments which are absolutely circular and in the shape of the outer skin.

It is therefore an underlying object of the invention to provide for a mechanism for use in a generic steering assembly which would make such an obstruction to the rotation of the steering wheel, which is dictated by the covering segments, immediately ineffective to stop steering wheel rotation.

The object is achieved by having each covering segment which is rotatively locked to the casing tube with a connecting means which lockingly engages and disengages said covering segment. The locked segment is lockingly disengageable by an obstruction to rotation of at least one of the steering wheel hub or a spoke which would interfere with rotation of the steering wheel if the locking engagement were not disengaged. In this manner at least one of the two covering segments can rotate with the steering wheel. The connecting means can be reengaged after the obstruction of rotation ceases.

Due to the disengagement of the elements of the connecting means, which rotationally lock the covering segments, when a torque exceeding a threshold value is introduced into the respective covering segment by the occurrence of an obstruction preventing rotation of the steering wheel hub or of a spoke, the covering segments can rotate together with the steering wheel and therefore no longer obstruct the steering movement. After the part causing the obstruction have been removed, each released covering segment is rotated back into its initial position, where it is reengaged by its connecting element.

This solution of the problem is independent of the shape of the outer skin of the covering segment and is therefore universally useful.

As a simple construction of a connecting means used for the engaging disengaging rotational lock, spring-loaded catch balls can be used which are pressed out of their cup-shaped depression in a casing tube prolongation by the threshold torque action, and reengaged into it by a spring after the covering segment is rotated back. The threshold torque at which the catch ball disengages is then determined by the spring characteristic.

The invention is equally applicable to fixed covering segments near the driver for steering assemblies in which the covering segment near the driver rotates with the steering wheel. Here, only the covering segment remote from the driver need be disengageable from its rotationally stable position relative to the casing tube.

A further advantage is obtained when the covering segment, nearest the steering wheel, is adjoined by an impact absorber piece which is fastened on the fixed casing tube prolongation and is rotatable relative to the nearest covering segment.

Other objects, advantages and novel features of the present invention will become apparent from the following detailed description of the invention when considered in conjunction with the accompanying drawings.

BRIEF DESCRIPTION OF THE DRAWINGS

FIG. 2 shows a sectional side elevation of this steering assembly with engaged covering segments; and FIG. 3 shows a sectional view along the line III-III from FIG. 2 with a possible rotary position of the covering segment shown by chain-dotted lines.

DETAILED DESCRIPTION OF THE DRAWINGS

Figure 1:
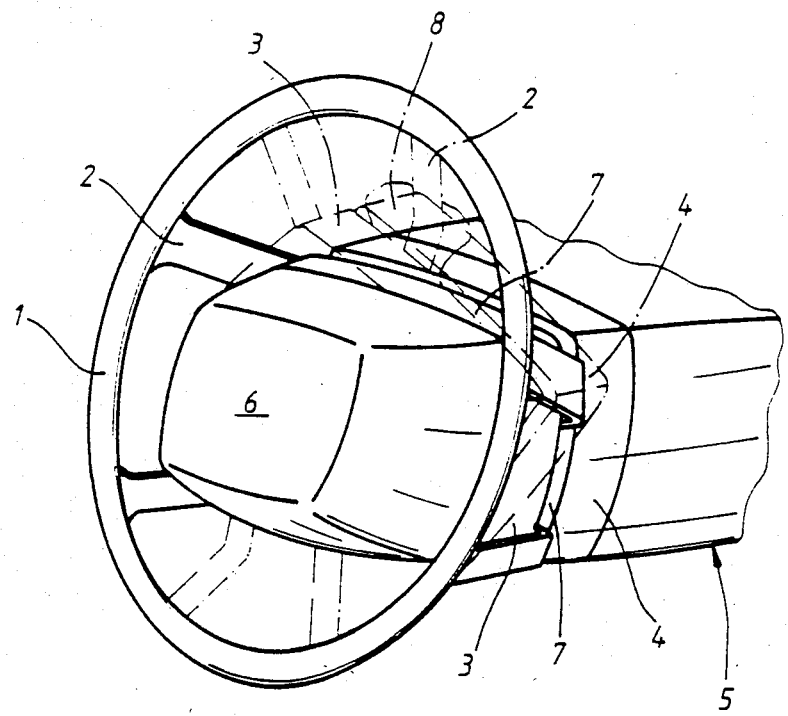
FIG. 1 shows a three-quarter view of a steering assembly with engaged covering segments, and disengaged covering segments shown by chain-dotted lines.

FIG. 1 shows a steering assembly having a steering wheel 1 having spokes 2 which pass through a gap 7 between two covering segments 3, 4 of a steering column covering 5 and wherein said spokes are fixed to a steering column by a steering wheel hub, not visible in FIG. 1.

An impact absorber plate 6 is arranged in front of the covering segment 3, adjacent to and facing the driver, for protecting the latter from injury in the case of a collision with the steering system.

Chain-dotted lines show a possible position of the covering segments 3, 4 when one of the spokes 2 becomes jammed with the covering segments 3, 4. Here a flexible obstruction 8 has slipped into the rotation gap 7 between the covering segments 3, 4 to obstruct the steering wheel 1 in its rotary movement. In order to prevent this, however, the covering segments 3, 4 are made to rotate in unison with the steering wheel 1 by disengagement of their connecting elements by which they are normally fixed to the casing tube 9.

FIG. 2 shows the normal and rotationally stable fixing of the two covering segments 3, 4 to a casing tube 9 extending beneath the steering column covering 5.

The covering segments 3, 4 are rotatable arranged on a radially divided casing tube prolongation 10. The spokes 2 of the steering wheel 1 merge into a steering wheel hub 11 which influences the rotation a steering column 12 centrally housed in the casing tube 9.

In order to prevent rotation of the covering segments 3, 4 with respect to the casing tube prolongation 10, a compression spring 15, 16 stresses catch balls 17, 18 radially into aligned blind bores 13, 14 in the prolongation 10. This acts as a connecting element 19, 20 between the casing tube prolongation 10 and the respective covering segment 3, 4, since a half part of the catch balls 17, 18 are engaged in a ball pan 21, 22 of the casing tube prolongation 10 while their other half is located in the blind bore 13, 14.

Now if a spoke 2 or the steering wheel hub 11 becomes jammed against one or both of the covering segments 3, 4, then a torque introduced by the steering wheel 1 into the respective covering segments 3, 4 drags either catch ball 17 or 18 out of its ball pan 21, 22 so that the covering segment 3, 4 rotates jointly with the steering wheel 1 and the movement of the latter is therefore not obstructed. In this manner the vehicle contines to be steerable by the steering wheel.

The impact absorber plate 6 is fastened on two coupled sections 23, 24 of the casing tube prolongation 10. The sections 23, 24 are firmly coupled to each other for rotation by a pinion shaft 25 which extends through the steering wheel hub 11 and meshes with female tooth systems 26 of the sections 23, 24, which corresponds to a rotationally fixed connection as already known from German patent application DE-OS 3,437,214.

The covering segment 3 near the driver, which can likewise be stably fixed in rotation relative to the casing tube prolongation 10, must therefore also be rotatable relative to the impact absorber plate 6 after its connecting element 19 is disengaged.

After the obstructing flexible part 8 has been removed, the rotated covering segments 3 and 4 can be rotated back manually into their initial position, after which the catch balls 17, 18 engage automatically through the compression springs 15, 16 and fix the covering segments 3, 4 stably in rotation to the casing tube 9.

Obviously, the invention is also capable of application to generic steering assemblies in which a covering segment near the driver is connected firmly in rotation to a steering wheel and rotates jointly with the latter, in which case only the covering segment farther from the driver, which is fixed stably in rotation to the casing tube, needs a connecting element which can be disengaged in the case of an obstruction of the steering wheel.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Steering assembly for motor cars having:
    a fixed casing tube means which centrally houses a steering column in its interior;
    the steering column is enclosed at an upper region in front of a steering wheel by two covering segments arranged side by side;
    a steering wheel hub is located adjacent said upper region and connected to spokes of the steering wheel which pass through an opening between the two covering segments;
    at least one of the two covering segments which is remote from the steering wheel, being rotatively locked and unlocked relative to the casing tube;
    wherein each segment has a spring loaded connecting means which lockingly engages said covering segment with said casing tube means and which is lockingly disengageable by a obstruction which prevents rotation of at least one of the steering wheel hub or a steering wheel spoke which would interfere with rotation of the steering wheel if the spring loaded locking engagement where not disengaged in order that at least one of the two covering segments can rotate with the steering wheel; and
    wherein the spring loaded connecting means can be reengaged after the obstruction of rotation ceases.

2. Steering assembly according to claim 1, wherein the two covering segments are arranged on a fixed, radially divided casting tube prolongation and are respectively lockable on the latter by a spring-loaded catch ball means.

3. Steering assembly according claim 2, wherein the covering segment nearest the steering wheel is adjoined by an impact absorber piece which is fastened on the fixed casing tube prolongation, and is rotatable relative to the nearest covering segment.

* * * * *